(12) United States Patent
Huetinck

(10) Patent No.: US 7,244,469 B2
(45) Date of Patent: Jul. 17, 2007

(54) METHOD OF ZINC PLATING AND POWDER COATING RESIDENTIAL GAS METER SET ASSEMBLIES

(75) Inventor: Mark Huetinck, Brea, CA (US)

(73) Assignee: R.W. Lyall Company, Inc., Corona, CA (US)

( * ) Notice: Subject to any disclaimer, the term of this patent is extended or adjusted under 35 U.S.C. 154(b) by 0 days.

(21) Appl. No.: 11/156,026

(22) Filed: Jun. 17, 2005

(65) Prior Publication Data

US 2006/0286293 A1   Dec. 21, 2006

(51) Int. Cl.
  *B05D 7/14*  (2006.01)
  *B05D 1/12*  (2006.01)
  *B05D 1/18*  (2006.01)
  *B05D 3/02*  (2006.01)

(52) U.S. Cl. .................. 427/406; 427/180; 427/321; 427/388.1; 427/409; 427/436

(58) Field of Classification Search ............... 427/406, 427/180, 294, 295, 314, 318, 321, 327, 328, 427/372.2, 375, 384, 388.1, 407.1, 409, 419.1, 427/350

See application file for complete search history.

(56) References Cited

U.S. PATENT DOCUMENTS

| | | | |
|---|---|---|---|
| 5,322,713 A | | 6/1994 | van Ooij et al. |
| 5,689,938 A | * | 11/1997 | Lyall et al. .................. 53/445 |
| 5,907,006 A | | 5/1999 | Rennie et al. |
| 6,251,515 B1 | | 6/2001 | Douais et al. |
| 6,276,400 B1 | * | 8/2001 | Jackson et al. .............. 138/143 |
| 6,419,992 B1 | * | 7/2002 | Lewin ........................ 427/470 |
| 6,528,125 B1 | | 3/2003 | Jackson et al. |
| 6,617,048 B1 | | 9/2003 | Yoshida et al. |
| 6,649,267 B2 | | 11/2003 | Agawa et al. |
| 6,800,190 B1 | | 10/2004 | Wilcox et al. |
| 2003/0211326 A1 | | 11/2003 | Seike et al. |

\* cited by examiner

*Primary Examiner*—William Phillip Fletcher, III
(74) *Attorney, Agent, or Firm*—Fulwider Patton LLP

(57) ABSTRACT

The present invention is a method for zinc plating a meter set assembly used in gas delivery applications, wherein a zinc plating is applied to a steel substrate formed in the configuration of a meter bar. Once the zinc plating is applied through electrodeposition, the meter set assembly is then outgassed in an oven as by curing at 425°-475° F. for 20-35 minutes to drive away any gasses that may be trapped within the zinc coating. Following the outgassing process, a polyester powder coating is applied to the external surfaces of the meter bar.

18 Claims, 1 Drawing Sheet

METHOD OF ZINC PLATING AND POWDER COATING RESIDENTIAL GAS METER SET ASSEMBLIES

FIELD OF THE INVENTION

The present invention relates generally to manufacturing methods for gas delivery conduits, and more particularly to a method of manufacturing polyester powder coated, zinc plated residential gas meter set assemblies.

BACKGROUND OF THE INVENTION

It is well known that natural gas is a clean and relatively inexpensive fuel source. As such, gas distribution systems have been widely installed in various population centers throughout the United States and many other countries of the world. To supply and provide gas service to end users, such as commercial and residential consumers, service pipelines are typically branched from main gas distribution pipelines laid along a utility route, for instance, under a roadway. These service pipelines typically incorporate an above ground shut-off valve, a pressure regulator for stepping down gas pressure to a gas meter, and therefrom the meter is plumbed to a gas inlet connection pipe typically stubbed outwardly from a side wall of the dwelling or facility.

A typical residential gas meter set assembly such as that shown in FIG. 1 may include a formed turned back U-fitting for mounting a pressure regulator, a regulator valve, and a strap defining a spacer bracket secured between such regulator and U-fitting. An example of such a meter set can be found in U.S. Pat. No. 5,501,331 to Lyall et al. and assigned to the present assignee, and is incorporated fully herein by reference. The U-fitting is formed from a length of metallic pipe and bent using an appropriate pipe bender to form a radiused U-shaped configuration to define parallel long and short legs, providing an inlet end and outlet end spaced apart and oriented to, in final assembly, locate the pressure regulator relative to the meter (not shown). The inlet end is formed with external threads and the outlet end is formed by a female threaded union fitting.

Traditional manufacture of the residential meter set assembly calls for fabrication of the meter set assembly using steel pipe with "hot headed" ends, bent as required, and welded to a portion of steel bar to maintain spacing and alignment. Following fabrication, the meter set assembly is zinc plated using an electrodeposition process for corrosion protection. U.S. Pat. No. 6,276,400 to Jackson et al. is illustrative of the techniques for applying corrosion resistant coating to a steel residential MSA. However, it has been discovered that bubbles tend to form in the polyester powder top coating due to gases released from the zinc plating bottom coat fabricated meter bar. The bubbles are undesirable from an aesthetics standpoint as it results in an uneven, rough surface, and further has an effect on the corrosion resistance due to increased exposure of the zinc plating to corrosive elements. The art is in need of an improved method that overcomes the shortcomings of the above-described process for manufacturing residential meter MSA bars.

SUMMARY OF THE INVENTION

The present invention is a method for zinc plating a meter set assembly wherein a zinc plating is applied to a steel substrate formed in the configuration of a meter set assembly used in a natural gas delivery system. Once plated, the meter set assembly is then outgassed in a heating step to drive away any gasses that may be trapped within the zinc coating. Following the outgassing process, a polyester powder coating is applied to the external surfaces of the meter piping assembly (excluding the threaded areas). It has been found that the outgas heating step may be carried out in an oven at 425°-475° F. for 20-35 minutes.

The above described method provides excellent corrosion resistance from the zinc plating which is further enhanced by the overcoating of polyester powder. The resulting surface possesses a smooth, glossy appearance of a polyester powder coating without the surface imperfections that occur when the substrate is not outgassed. The dual coating further protects the meter set assembly in that damage that can result to the powder coating during handling and installation of the meter set assembly (particularly from pipe wrenches that may be used to tighten threaded joints) does not result in a serious reduction in the corrosion resistance of the meter set assembly as the zinc plating tends not to be significantly damaged and will continue to afford protection in areas where the polyester powder coating had been displaced.

Other features and advantages of the invention will become apparent from the following detailed description, taken in conjunction with the accompanying drawing which illustrates, by way of example, a meter set assembly of the type benefiting from the disclosed invention.

DETAILED DESCRIPTION OF THE INVENTION

Figure 1:
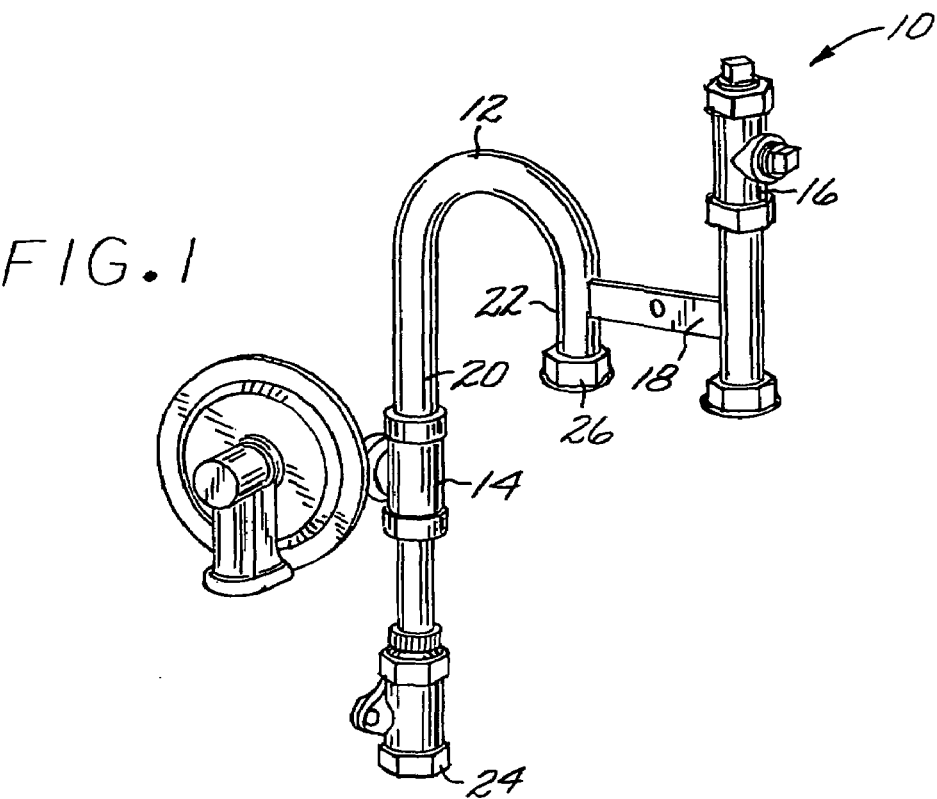
FIG. 1 is an elevated, perspective view of a meter set assembly of the type manufactured by the method of manufacturing of the present invention.
Figure 2:
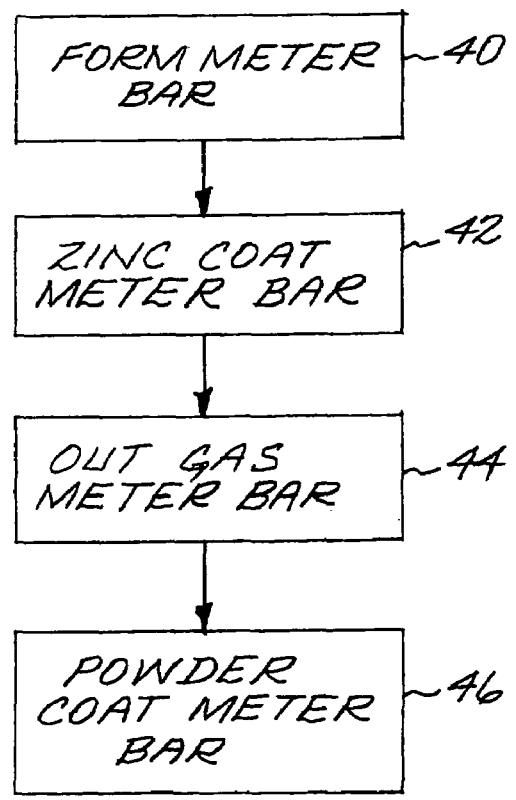
FIG. 2 is a diagrammatic drawing showing the method of the present invention.

The meter piping set assembly such as that shown in FIG. 1 is fabricated using steel pipe or other selection of metal that meets the needs of the user as at 40 (FIG. 2), including strength, cost, corrosion resistance, plating compatibility, workability/machinability, and welding effectiveness. The meter set assembly 10 in FIG. 1 includes a formed turned back U-fitting 12 for mounting a pressure regulator 14, a regulator valve 16, and a strap 18 defining a spacer bar secured between such regulator 16 and the U-fitting 12. The U-fitting is formed from a length of metallic pipe and bent using an appropriate pipe bender to form a radiused U-shaped configuration to define parallel long 20 and short 22 legs, providing an inlet end 24 and outlet end 26 spaced apart and oriented to, in final assembly, locate the pressure regulator relative to the meter (not shown). Herein, I define the meter set assembly as the various components to make up an assembly for delivering gas to a meter and a meter bar set as the assembled components, both of which serve the end purpose of delivering gas to the meter.

Following fabrication, the meter set assembly is cleaned of scale, varnish slag and the like and zinc plated 42 using an electro-deposition process. The process is subject to ASTM corrosion resistance requirements, and preferably ASTM B633. For commercial grade, the preferred plating includes a thickness class SC 2, 8 µm minimum, with a type II yellow chromate conversion coating. With a severe service condition grade, plating includes a thickness class SC 3, 12 µm minimum, with a type II clear chromate conversion finish. For a powder coat grade, plating should include a thickness class SC 3, 12 μm minimum, with a type I "as-plated" finish. For commercial grade, the thickness should be SC 2, 8 μm minimum, with a type III clear chromate conversion coating. In the present case, the preferred plating is the powder coat grade.

The most important factor determining the quality of a coating on metal part: is its thickness on significant surfaces. Fundamental laws of electrochemistry operate to prevent perfectly uniform deposition of an electrodeposit on a cathode of any useful shape and size. Portions of the substrate which are nearer to the anodes tend to receive a heavier deposit. Sharp edges or protrusion: tend to collect a larger portion of the available current and thusly receive a greater deposit. The goal of the part designer and the plater is to minimize thickness variations over significant surfaces. At the same time uneconomical wastage of metal by excessive build-up on non-significant areas must be avoided. Variations in plate distribution may not allow parts to be assembled properly—due to heavy buildup in high current density areas.

A properly applied zinc finish of high quality will have an acceptable appearance not only on the shelf but also throughout the service life of the part. Steel surfaces rust readily even in mildly corrosive surroundings. The rust not only is unattractive but may interfere with mechanical functioning of a component or discolor materials in contact with it. Zinc electrodeposits afford excellent protection against rusting under most circumstances. The reason for applying zinc may be classified as (a) to retard rusting, (b) to provide a pleasing appearance and (c) to serve some functional capacity.

(a) Rust Prevention—The corrosion rates of zinc deposits are much lower than those of steel in most atmospheres a well as in contact with water. In addition, the electrochemic relationships between each of these two metals and steel are such that rusting of the latter is suppressed by galvanic action where the coating is damaged or worn through.

(b) Appearance—zinc coatings provide a durable, pleasing appearance for the typical period of useful life of a steel part. The aesthetics of zinc coatings have been enhanced by the availability of bright zinc deposits and the development of chromate conversion coatings and colored finishes.

(c) Functional Service—Zinc may be deposited on steel components to serve functional purposes while retarding rusting. Examples of such uses are to improve solderability, to lower electrical contact resistance and to provide surface conductivity, and to reduce or eliminate bimetallic corrosion through the use of mixed metal mechanically deposited coatings. The slower rate of corrosion of zinc deposits in industrial atmospheres has been attributed to the fact that zinc corrosion products formed in such atmospheres are alkaline in character and of low solubility.

During the zinc plating, the parts are manipulated to displace air that may be trapped within cavities and crevices, and to ensure as complete coverage as possible of the zinc plating over the surfaces of the meter bar.

After completion of the zinc plating process, the parts are heated at 44 (FIG. 2) in an oven for a period of time and at a temperature sufficient to drive away any gasses that may be trapped within the zinc coating. This process is referred to as outgassing. In a preferred method, the parts are cured at 425°-475° F. for at least twenty minutes, and more preferably in the range of twenty to thirty five minutes prior to powder coating. The outgassing drives off contaminants and gasses that may become trapped in the zinc coating during the electro-deposition process. The resulting surface is smoother, more free of flaws and imperfections, and less susceptible to corrosion.

Following the outgassing process, a polyester powder coating at 46 is preferably applied to the external surfaces of the meter set assembly (excluding the threaded areas). One preferred powder coating is polyester tryglycidyl isocyanurate (TGIC) ASA #49 smooth. This coating is glossy gray in color. Polyester TGIC coatings utilize the epoxy functional crosslinker TGIC (triglycidyl isocyanurate). Use of this low molecular weight, multifunctional crosslinker enables polyester TGIC formulations to contain 90% or greater resin within the binder system. Weathering of polyester TGIC powders is comparable to polyester urethane coatings.

Polyester TGIC coatings typically offer faster or lower temperature curing than polyurethanes. Unlike urethane coatings, TGIC's maintain excellent mechanical properties at film builds above 3 mils. Additionally, TGIC coatings provide superior edge coverage when sharp edges are present.

In the present method, the preferred specific gravity of the TGIC coating is 1.50-1.8 per ASTM D5965-96c. At 60 degrees, gloss is within the range of 55-70 per ASTM D523. Pencil hardness shall be minimum 2H per ASTM D3363. Impact resistance shall be 20 cycles of 20 in lbs. per ASTM D2794. Flexibility shall be minimum ¼ inch radii per ASTM D522. Salt spray resistance is greater than 1000 hours per ASTM B117 when applied at a 1.5 millimeter minimum thickness. The powder should be capable of a full cure at 400° F. within ten minutes of application.

The coating is applied to a thickness of between 1.5 and 3.0 millimeters minimum and is preferrably preheated to 425°-475° F. before coating.

The above described method provides excellent corrosion resistance from the zinc plating which is further enhanced by the overcoating of polyester powder. When properly done, the meter set assembly will withstand over 1000 hours of salt spray when tested in accordance with ASTM B117. The resulting surface possesses a smooth, glossy appearance of a polyester powder coating without the surface imperfections that occur when the substrate is not outgassed. The dual coating further protects the meter set assembly in that damage that can result to the powder coating during handling and installation of the meter set assembly.

The method of manufacture described above is illustrative of the present invention. It will be appreciated that the instant coating method is applicable to the fully formed and constructed meter set depicted in the drawing or may be employed to coat the various component parts of the meter assembly depicted or the parts of differently configured meter assemblies, it only being important that the method be practiced per the appended claims to provide a coated meter assembly for use in installing a gas meter. Those of ordinary skill in the art will readily recognize variations of the above-described methods, and such variations should be considered within the scope of the invention. The above described methods are not intended to the limiting in any manner, and the scope of the invention should be measured by the words of the appended claims, taken in their ordinary meaning in conjunction with the specification and documents cited therein.

I claim:

1. A method of manufacturing a meter set assembly for a gas delivery system comprising:

forming a meter set assembly configured with a U-shaped conduit adapted to mount a pressure regulator, a regulator valve, and a spacer bracket secured between such regulator and U-shaped fitting;

forming a zinc coating on the meter set;

outgassing the meter set assembly in an oven heated to 425°-475° F. for at least twenty minutes after the formation of the zinc coating; and applying a powder coating to the meter set after the outgassing step.

2. The method of manufacturing a meter set assembly of claim 1 wherein the meter set assembly is formed of steel.

3. The method of manufacturing a meter set assembly of claim 1 wherein the meter set assembly is formed of iron.

4. The method of manufacturing a meter set assembly of claim 1 wherein the zinc coating is formed to include a thickness of at least 12 µm.

5. The method of manufacturing a meter set assembly of claim 1 wherein the zinc coating is applied by electrodeposition.

6. The method of manufacturing a meter set assembly of claim 1 wherein the outgassing is conducted in the oven for between twenty and thirty five minutes.

7. The method of manufacturing a meter set assembly of claim 1 wherein the powder coating is with polyester tryglycidyl isocyanurate (TGIC).

8. The method of manufacturing a meter set assembly of claim 7 wherein a specific gravity of the TGIC coating is 1.50-1.8.

9. The method of manufacturing a meter set assembly of claim 7 wherein the powder is applied to provide a gloss of the powder coating within the range of 55-70 at 60 degrees.

10. The method of manufacturing a set assembly of claim 7 wherein the powder coating is selected to provide an impact resistance of 20 cycles of 20 in lbs.

11. The method of manufacturing a meter set assembly of claim 1 that includes moving the meter set assembly in a zinc bath during the zinc plating to promote a more complete coverage of the meter bar.

12. The method of manufacturing a meter set assembly of claim 1 that includes, prior to the zinc coating step, preheating the surface of the meter set assembly to a temperature 425°-475° F.

13. The method of claim 1 that includes applying the powder coating to the meter set assembly to a thickness sufficient to, in combination with the zinc coating, resist spray of salt water thereon for at least 1000 hours.

14. A method of manufacturing a meter set assembly for a gas delivery system comprising:

forming a steel meter set assembly configured with a U-shaped conduit adapted to mount a pressure regulator, a regulator valve, and a spacer bracket secured between such regulator and U-shaped fitting;

electrodepositing a zinc coating on the meter set assembly of a thickness of at least 12 µm;

outgassing the meter set assembly in an oven heated to 425°-475° F. for between twenty minutes and thirty five minutes after the electrodepositing step; and applying a powder coating of polyester tryglycidyl isocyanurate (TGIC) to the meter bar after the outgassing step.

15. A method of manufacturing a meter bar set for a gas delivery system comprising:

forming a meter bar configured with a U-shaped conduit adapted to mount a pressure regulator, a regulator valve, and a spacer bracket secured between such regulator and U-shaped fitting;

forming a zinc coating on the meter bar;

outgassing the meter bar set in an oven heated to 425°-475° F. for at least twenty minutes after the formation of the zinc coating; and applying a powder coating to the meter bar after the outgassing step.

16. The method of manufacturing a meter bar set of claim 15 wherein the zinc coating is applied by electrodeposition.

17. The method of manufacturing a meter bar set of claim 15 wherein the outgassing is conducted in the oven for between twenty and thirty five minutes.

18. The method of manufacturing a meter bar set of claim 15 wherein the powder coating is with polyester tryglycidyl isocyanurate (TGIC).

* * * * *